US012470007B2

(12) United States Patent
Seki et al.

(10) Patent No.: US 12,470,007 B2
(45) Date of Patent: Nov. 11, 2025

(54) CONNECTOR

(71) Applicant: SUMITOMO WIRING SYSTEMS, LTD., Mie (JP)

(72) Inventors: Shoma Seki, Mie (JP); Yuki Horiguchi, Mie (JP)

(73) Assignee: SUMITOMO WIRING SYSTEMS, LTD., Mie (JP)

( * ) Notice: Subject to any disclaimer, the term of this patent is extended or adjusted under 35 U.S.C. 154(b) by 273 days.

(21) Appl. No.: 18/275,166

(22) PCT Filed: Feb. 1, 2022

(86) PCT No.: PCT/JP2022/003735

§ 371 (c)(1),
(2) Date: Jul. 31, 2023

(87) PCT Pub. No.: WO2022/176595

PCT Pub. Date: Aug. 25, 2022

(65) Prior Publication Data

US 2025/0087925 A1 Mar. 13, 2025

(30) Foreign Application Priority Data

Feb. 19, 2021 (JP) ................................ 2021-025266

(51) Int. Cl.
*H01R 13/436* (2006.01)
*H01R 13/6597* (2011.01)

(52) U.S. Cl.
CPC ..... *H01R 13/4362* (2013.01); *H01R 13/6597* (2013.01)

(58) Field of Classification Search
None
See application file for complete search history.

(56) References Cited

U.S. PATENT DOCUMENTS 9,882,317 B1 * 1/2018 Lane .................. H01R 13/6588
9,893,467 B2 * 2/2018 Chen .................... H01R 13/426
(Continued)

FOREIGN PATENT DOCUMENTS

JP H09-213416 A 8/1997
JP 2003-223960 A 8/2003
JP 2020-205159 A 12/2020

OTHER PUBLICATIONS

International Search Report issued on Apr. 19, 2022 for WO 2022/176595 A1 (4 pages).

*Primary Examiner* — Felix O Figueroa
(74) *Attorney, Agent, or Firm* — Venjuris, P.C.

(57) ABSTRACT

A connector is provided with a shield terminal to be connected to a cable configured such that an outer periphery of a wire is surrounded by a shield body, a plurality of terminals, a housing for accommodating the shield terminal and the plurality of terminals, a retainer held on the housing movably between a temporary locking position and a complete locking position in an arrangement direction of the plurality of terminals and configured to retain the plurality of terminals at the complete locking position, and a detecting member held on the housing movably between an initial position and a detection position in an inserting/withdrawing direction of the shield terminal and configured to move to the detection position by the shield terminal being accommodated to a proper position inside the housing.

3 Claims, 15 Drawing Sheets

(56) References Cited

U.S. PATENT DOCUMENTS

| | | | | |
|---|---|---|---|---|
| 11,177,607 | B2 * | 11/2021 | Takayanagi ........ | H01R 13/4362 |
| 2020/0083633 | A1 | 3/2020 | Maesoba et al. | |
| 2021/0143585 | A1 | 5/2021 | Maesoba et al. | |

* cited by examiner

CONNECTOR

CROSS REFERENCE TO RELATED APPLICATIONS

This application is a national phase of PCT application No. PCT/JP2022/003735, filed on 1 Feb. 2022, which claims priority from Japanese patent application No. 2021-025266, filed on 19 Feb. 2021, all of which are incorporated herein by reference.

TECHNICAL FIELD

The present disclosure relates to a connector.

BACKGROUND

A connector described in Japanese Patent Laid-open Publication No. 2018-152174 (Patent Document 1 below) is conventionally known as a connector provided on an end part of a high-speed communication cable. A shield connector described in Patent Document 1 is provided with a shield terminal including a dielectric holding an inner conductor and an outer conductor surrounding the dielectric, and a first housing into which the shield terminal is inserted. The outer conductor is formed with a first locking portion by cutting and raising a part of an outer surface. The first locking portion is locked to a first locking lance provided in the first housing. A front retainer is mounted on the first housing and, with the shield terminal inserted to a proper position in the first housing, the deflection and deformation of the first locking lance is restricted by pushing the front retainer to a complete locking position.

PRIOR ART DOCUMENT

Patent Document

Patent Document 1: JP 2018-152174 A

SUMMARY OF THE INVENTION

Problems to be Solved

Here, it is considered to configure a connector by mounting a plurality of terminals into the shield connector of Patent Document 1, separately from the shield terminal. Such as when the plurality of terminals have a small size, it may be preferable to adopt a slide-type retainer configured to move in an arrangement direction of the plurality of terminals, instead of the front retainer configured to move in an inserting/withdrawing direction of the shield terminal with respect to the first housing in order to retain the plurality of terminals in the first housing.

To detect an insertion position of the shield terminal by the above retainer, it is, for example, considered to provide the shield terminal with a recess constituting a space, into which the retainer is insertable. However, if a hole is provided in the outer conductor to provide the shield terminal with the recess, the shielding performance of the connector is reduced. Therefore, depending on shielding performance required for the connector, the size of the connector and the like, a hole cannot be provided in the outer conductor and it cannot be detected by the retainer that the shield terminal has been inserted to the proper position in the first housing.

Means to Solve the Problem

The present disclosure is directed to a connector with a shield terminal to be connected to a cable configured such that an outer periphery of a wire is surrounded by a shield body, a plurality of terminals, a housing for accommodating the shield terminal and the plurality of terminals, a retainer held on the housing movably between a temporary locking position and a complete locking position in an arrangement direction of the plurality of terminals, the retainer retaining the plurality of terminals inside the housing by moving to the complete locking position, and a detecting member held on the housing movably between an initial position and a detection position in an inserting/withdrawing direction of the shield terminal, the detecting member moving to the detection position by the shield terminal being accommodated to a proper position inside the housing, the shield terminal including an inner conductor, a dielectric for accommodating the inner conductor and a tubular outer conductor for covering an outer periphery of the dielectric and to be electrically connected to the shield body, the retainer being disabled to move to the complete locking position by interfering with the detecting member when the detecting member is not at the detection position, and the retainer being movable to the complete locking position when the detecting member is at the detection position.

Effect of the Invention

According to the present disclosure, it is possible to provide a connector capable of detecting the insertion of a shield terminal to a proper position inside a housing by a retainer for retaining terminals different from the shield terminal.

DETAILED DESCRIPTION TO EXECUTE THE INVENTION

Description of Embodiments of Present Disclosure

Figure 1:
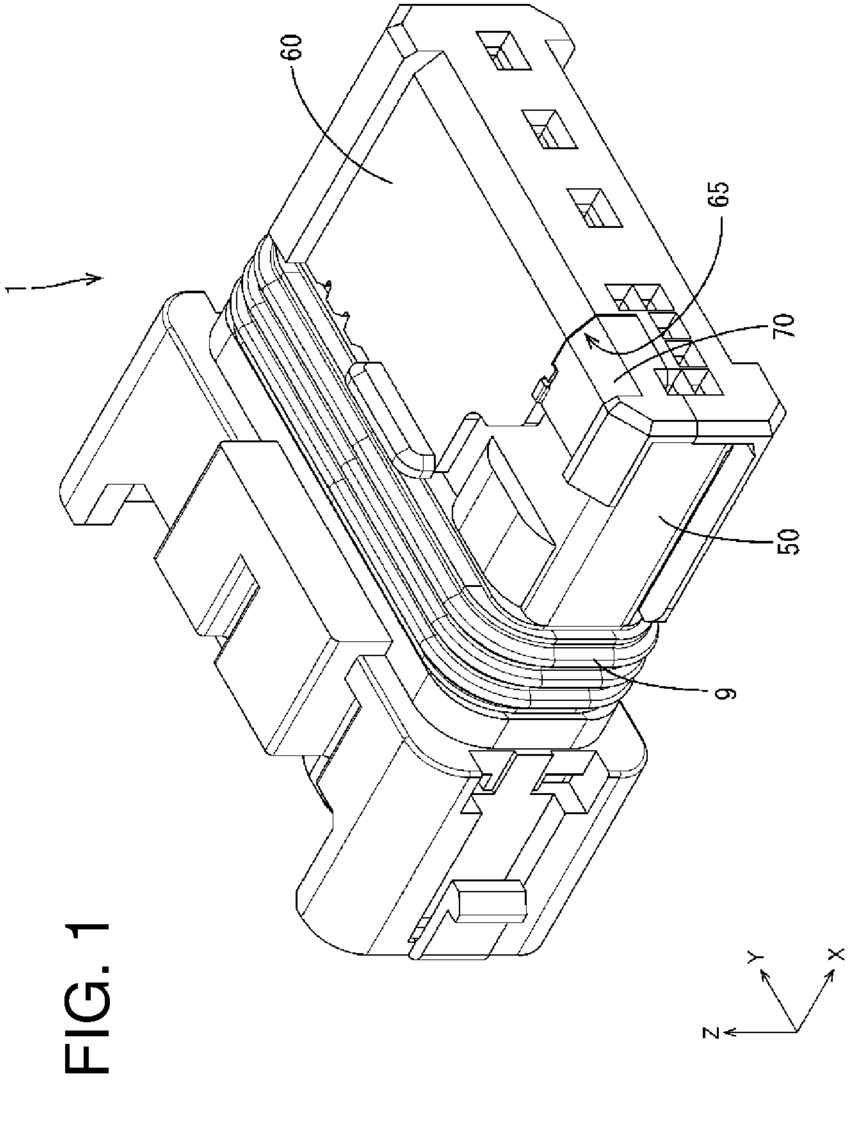
FIG. 1 is a perspective view of a connector according to an embodiment.

First, embodiments of the present disclosure are listed and described.

(1) The connector of the present disclosure is provided with a shield terminal to be connected to a cable configured such that an outer periphery of a wire is surrounded by a shield body, a plurality of terminals, a housing for accommodating the shield terminal and the plurality of terminals, a retainer held on the housing movably between a temporary locking position and a complete locking position in an arrangement direction of the plurality of terminals, the retainer retaining the plurality of terminals inside the housing by moving to the complete locking position, and a detecting member held on the housing movably between an initial position and a detection position in an inserting/withdrawing direction of the shield terminal, the detecting member moving to the detection position by the shield terminal being accommodated to a proper position inside the housing, the shield terminal including an inner conductor, a dielectric for accommodating the inner conductor and a tubular outer conductor for covering an outer periphery of the dielectric and to be electrically connected to the shield body, the retainer being disabled to move to the complete locking position by interfering with the detecting member when the detecting member is not at the detection position, and the retainer being movable to the complete locking position when the detecting member is at the detection position.

According to this configuration, since the retainer is movable to the complete locking position, it can be detected that the shield terminal has been accommodated to the proper position inside the housing.

(2) Preferably, the connector is provided with a tubular conductive rubber member for electrically connecting the outer conductor and the shield body, a terminal module is configured to include the conductive rubber member, the cable, the inner conductor and the dielectric, and the detecting member moves from the initial position to the detection position by contacting the terminal module when the terminal module is inserted into the outer conductor accommodated in the housing.

According to this configuration, the shield terminal can be easily assembled and accommodated to the proper position in the housing by inserting the terminal module into the outer conductor accommodated in the housing.

(3) Preferably, the detecting member includes an engaging portion, and the retainer includes an engaged portion to be engaged with the engaging portion by the retainer moving to the complete locking position when the detecting member is at the detection position.

According to this configuration, by the engagement of the engaging portion of the detecting member and the engaged portion of the retainer, it can be detected that the shield terminal has been accommodated to the proper position inside the housing.

Details of Embodiment of Present Disclosure

Hereinafter, an embodiment of the present disclosure is described. The present invention is not limited to these illustrations, but is represented by claims and intended to include all changes in the scope of claims and in the meaning and scope of equivalents.

EMBODIMENT

The embodiment of the present disclosure is described with reference to FIGS. 1 to 16. A connector 1 of this embodiment is used for wired high-speed communication in an automotive vehicle. In the following description, a direction indicated by an arrow Z is referred to as an upward direction, a direction indicated by an arrow X is referred to as a forward direction and a direction indicated by an arrow Y is referred to as a leftward direction. Note that, for a plurality of identical members, only some members may be denoted by a reference sign, but the other members may not be denoted by the reference sign.

[Connector]

Figure 6:
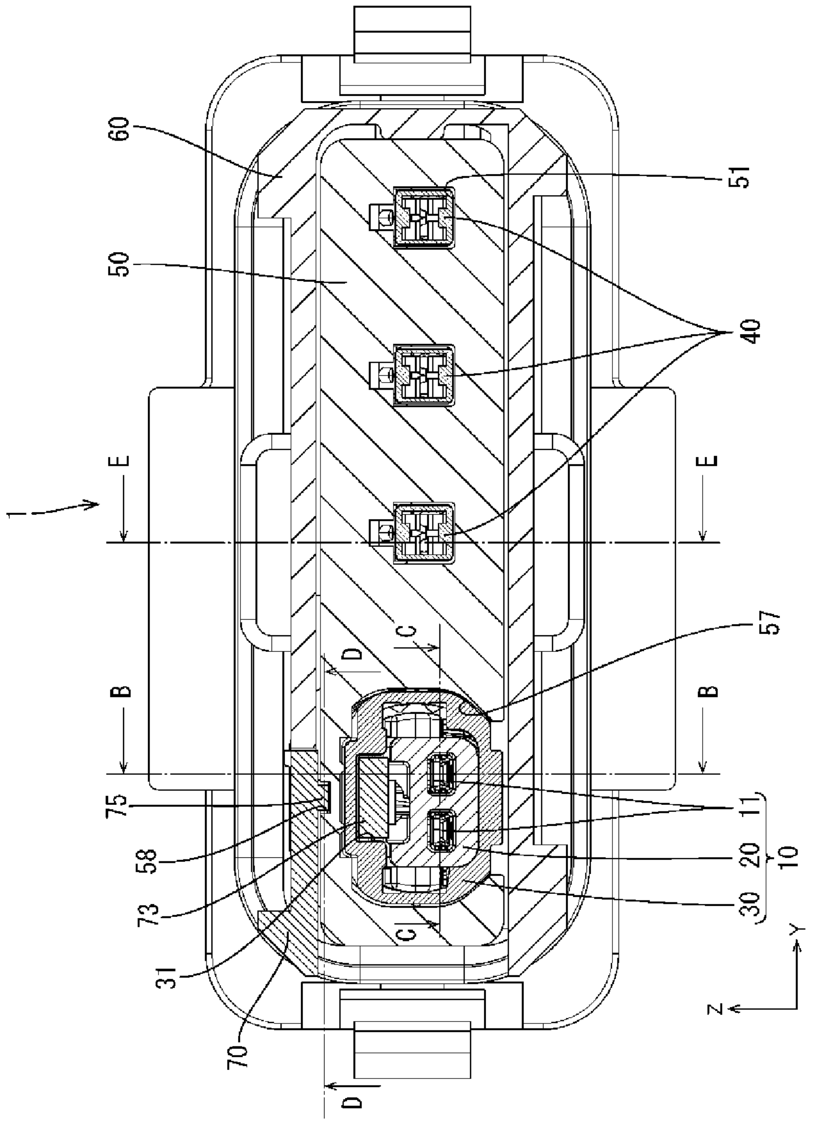
FIG. 6 is a section along A-A of FIG. 4.
Figure 13:
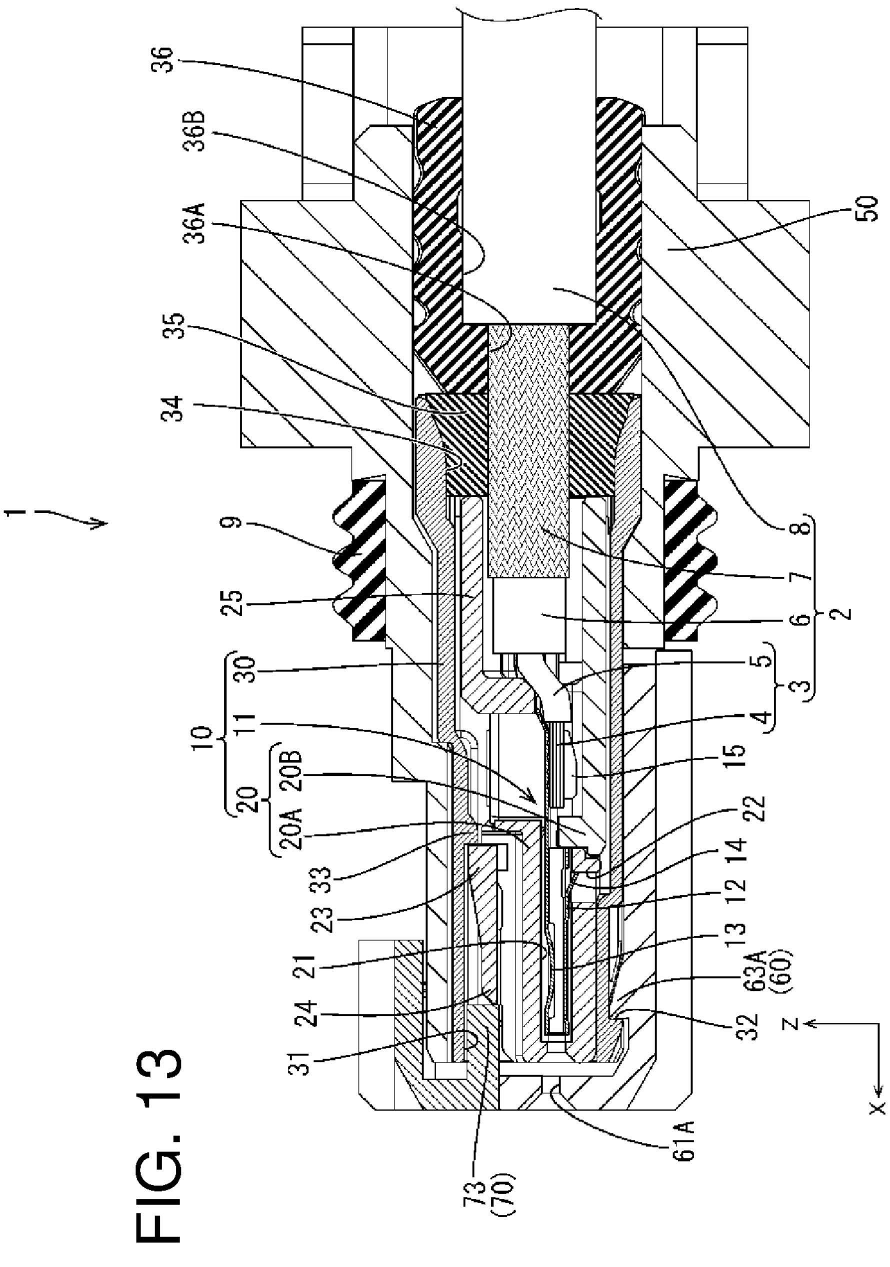
FIG. 13 is a section along B-B of FIG. 6 showing a state where the terminal module is inserted to the proper position.
Figure 16:
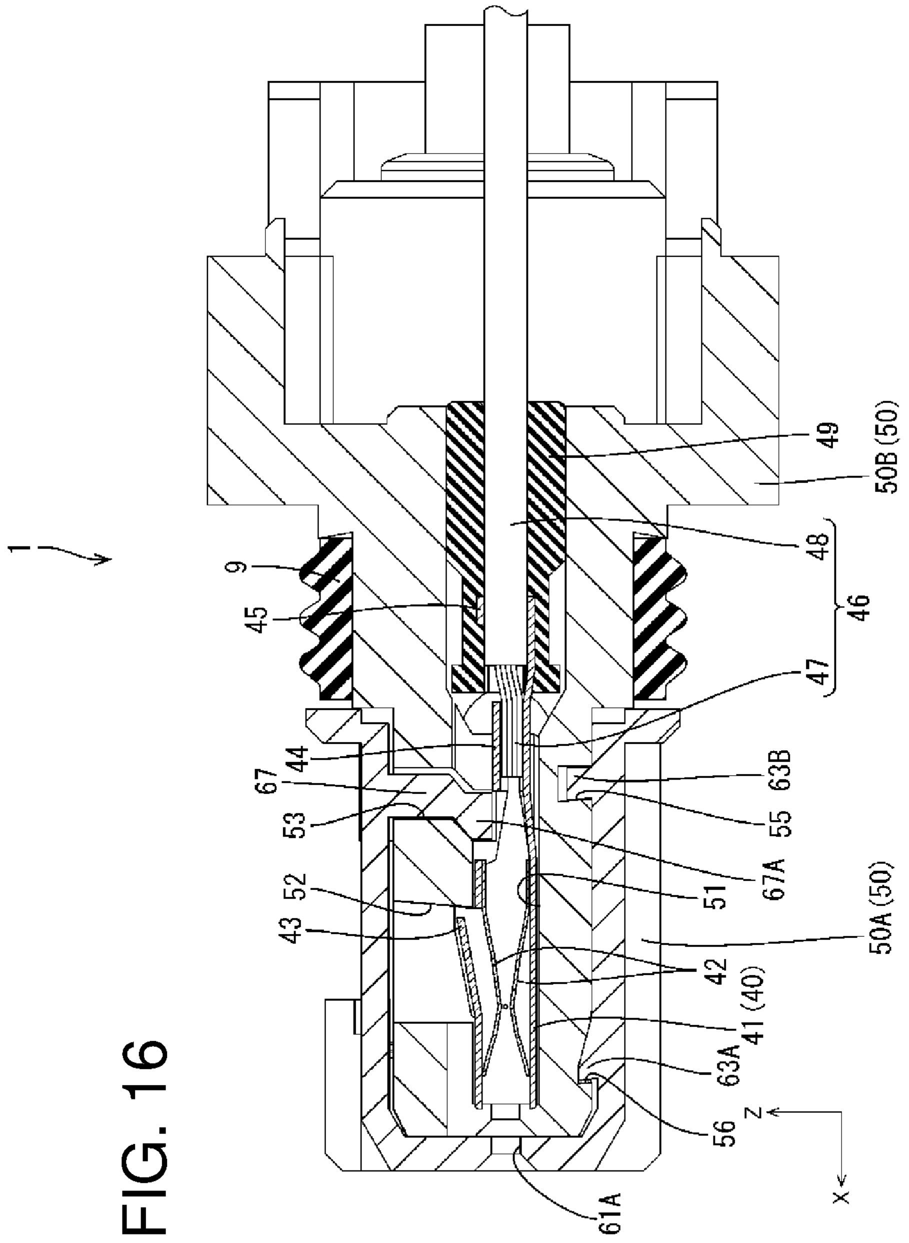
FIG. 16 is a section along E-E of FIG. 6 showing a state where the retainer is at the complete locking position.

As shown in FIG. 6, the connector 1 is provided with a shield terminal 10, a plurality of terminals 40, a housing 50 for accommodating the shield terminal 10 and the plurality of terminals 40, a retainer 60 for retaining the plurality of terminals 40 inside the housing 50 and a detecting member 70 for detecting whether or not the shield terminal 10 has been accommodated to a proper position. As shown in FIG. 13, the shield terminal 10 is connected to an end part of a cable 2 for high-speed communication. As shown in FIG. 16, the terminal 40 is connected to an end part of a general wire 46. Since a transmission route for high-speed communication and a transmission circuit for general electrical signals are simultaneously constructed by using the connector 1, a wiring harness in the automotive vehicle is easily designed.

As shown in FIG. 1, a water stop member 9 covering the outer periphery of the housing 50 is provided in a central part in a front-rear direction of the connector 1. The water stop member 9 is held in close contact with the inner periphery of a receptacle (not shown) of a mating connector serving as a connection partner of the connector 1, thereby suppressing water intrusion into a space between the housing 50 and the receptacle.

[Cable, Wires, Shield Body]

Figure 14:
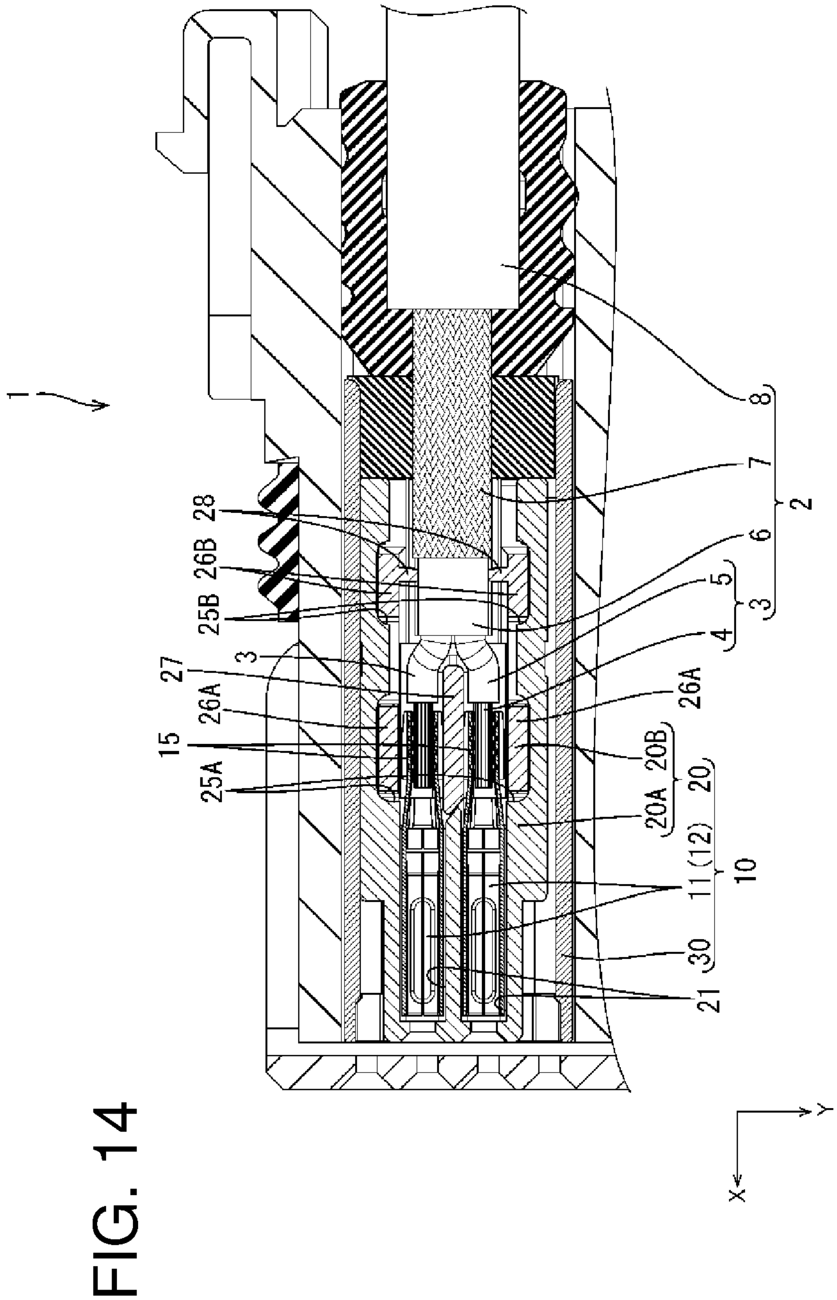
FIG. 14 is a section along C-C of FIG. 6 showing the periphery of the terminal module.

The cable 2 of this embodiment is used in communication of 100 Mbps or more and, as shown in FIG. 14, is a twisted pair cable (only a tip is shown). The cable 2 includes two wires 3 twisted each other. The wire 3 includes a core wire 4 and an insulation coating 5 covering the outer periphery of the core wire 4. The two twisted wires 3 are covered by an intervening insulating layer 6. A shield body 7 and a sheath 8 covering the outer periphery of the shield body 7 are provided further outside the intervening insulating layer 6.

[Shield Terminal]

As shown in FIGS. 13 and 14, the shield terminal 10 includes inner conductors 11, a dielectric 20 for accommodating the inner conductors 11 and an outer conductor 30 for covering the outer periphery of the dielectric 20.

[Inner Conductor]

As shown in FIG. 13, the inner conductor 11 of this embodiment is a female terminal. The inner conductor 11 is fabricated by press-molding a metal plate material of stainless steel or the like. A front part of the inner conductor 11 is provided with a connecting tube portion 12 in the form of a rectangular tube. A leaf spring portion 31 projecting inwardly of the connecting tube portion 12 is provided on an upper wall part of the connecting tube portion 12. A male terminal (not shown) of the mating connector is inserted into the connecting tube portion 12. This male terminal is an inner conductor provided in a shield terminal of the mating connector. By the contact of the male terminal with the leaf spring portion 13, the male terminal and the inner conductor 11 are electrically connected. A rear part of the connecting tube portion 12 is provided with a locking portion 14 projecting downward from the outer surface of the connecting tube portion 12. A rear part of the inner conductor 11 is provided with a wire barrel 15 to be electrically connected to the core wire 4.

[Dielectric]

Figure 7:
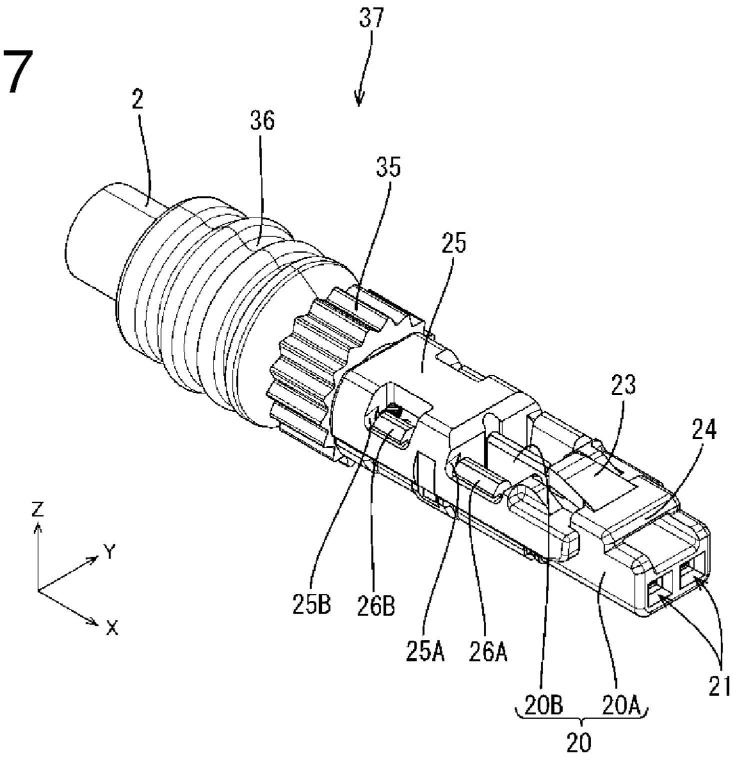
FIG. 7 is a perspective view of a terminal module.

As shown in FIGS. 7, 13 and 14, the dielectric 20 of this embodiment includes a first dielectric 20A and a second dielectric 20B. The first and second dielectrics 20A, 20B are formed of insulating resin such as polyethylene.

As shown in FIG. 14, a front part of the first dielectric 20A is provided with two tube accommodating portions 21 penetrating in the front-rear direction. The connecting tube portions 12 of the inner conductors 11 are accommodated in parallel in a lateral direction in the tube accommodating portions 21. As shown in FIG. 13, a locking recess 22 to be locked to the locking portion 14 of the inner conductor 11 is formed in a lower wall part in a rear part of the tube accommodating portion 21. As shown in FIG. 7, a locking piece 23 is provided above the tube accommodating portions 21. The locking piece 23 is cantilevered rearward from a rear end part of an arched portion 24 provided in central parts in the front-rear direction of the tube accommodating portions 21.

As shown in FIG. 7, a rear part of the first dielectric 20A is provided with a base portion 25. The base portion 25 includes front engaging portions 25A and rear engaging portions 25B formed to penetrate in a vertical direction. The front and rear engaging portions 25A, 25B are respectively engaged with front engaging claws 26A and rear engaging claws 26B of the second dielectric 20B. As shown in FIG. 13, the base portion 25 covers the shield body 7, the intervening insulating layer 6, the wires 3 and the like on an end part of the cable 2 from above. As shown in FIG. 14, since the front engaging portions 25A are disposed to include connected parts of the wire barrels 15 of the inner conductors 11 and the core wires 4, an operation of connecting the wire barrels 15 and the core wires 4 is facilitated.

As shown in FIG. 13, the second dielectric 20B is assembled with the base portion 25 to cover rear parts of the inner conductors 11 and the shield body 7, the intervening insulating layer 6, the wires 3 and the like on the end part of the cable 2 from below. As shown in FIG. 14, the second dielectric 20B includes two front engaging claws 26A to be engaged with the front engaging portions 25A and two rear engaging claws 26B to be engaged with the rear engaging portions 25*b*. A wall-like partitioning portion 27 projecting from the inner peripheral surface of the second dielectric 20B is provided between the two front engaging claws 26A. The partitioning portion 27 partitions and insulates between the inner conductors 11 and the core wires 4 arranged in parallel in the lateral direction.

As shown in FIG. 14, the two rear engaging claws 26B include claw-like clamp portions 28 projecting inward from the inner peripheral surfaces. The clamp portions 28 are members for fixing the end part of the cable 2 disposed inside the dielectric 20 with respect to the dielectric 20. The clamp portions 28 of this embodiment are disposed to clamp the intervening insulating layer 6. Unillustrated cut portions are provided in parts of the intervening insulating layer 6 to be clamped by the clamp portions 28 to position the cable 2 and the dielectric 20. Further, the intervening insulating layer 6 may be clamped in a pressed state by the clamp portions 28 without including the cut portions. As another embodiment, clamp portions may be disposed to clamp a shield body or may be provided on the inner peripheral surface of a first dielectric.

[Outer Conductor]

Figure 8:
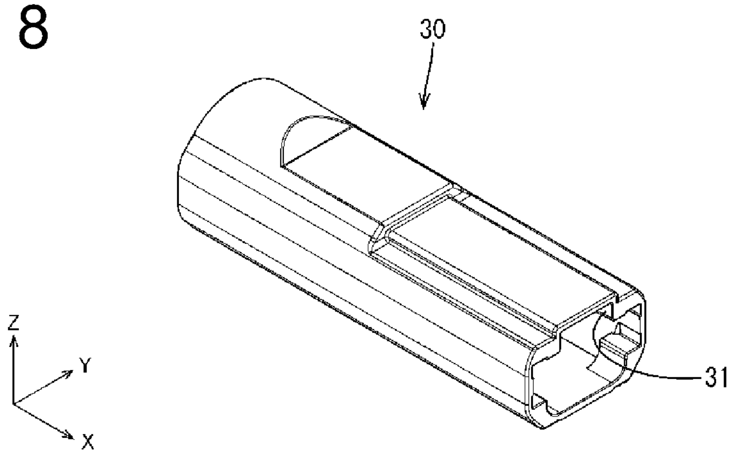
FIG. 8 is a perspective view of an outer conductor.

The outer conductor 30 is made of metal such as zinc alloy and, as shown in FIG. 8, configured into a tubular shape. As shown in FIGS. 6, 13 and 14, the dielectric 20 assembled with the inner conductors 11 is accommodated into the outer conductor 30. The outer conductor 30 is a member for shielding electromagnetic waves radiated from the inner conductors 11 and the core wires 4 and electromagnetic waves from the outside of the outer conductor 30. The outer conductor 30 is grounded by contacting an unillustrated ground terminal. Thus, an induced current generated in the outer conductor 30 by electromagnetic waves escapes to ground. Further, the outer conductor 30 is electrically connected also to the shield body 7 of the cable 2 (to be described in detail later). Thus, an induced current generated in the shield body 7 escapes to ground via the outer conductor 30.

The outer conductor 30 is a cast body fabricated by filling a molten alloy into a mold. More specifically, the outer conductor 30 of this embodiment is die-cast by injecting a molten metal into the mold. The outer conductor 30 constituted by a cast body is fabricated to include no hole open in a peripheral surface, so that electromagnetic waves do no enter or are not radiated. Therefore, the connector 1 of this embodiment provided with the outer conductor 30 is excellent in shielding performance.

As shown in FIGS. 6 and 13, a detecting protrusion receiving portion 31 is provided by recessing the inner peripheral surface of a front end part of an upper side of the outer conductor 30. The detecting protrusion receiving portion 31 is engaged with a detecting protrusion 73 of the detecting member 70 to be described later. As shown in FIG. 13, a locking recess 32 recessed upward is formed in the outer peripheral surface on a front-lower side of the outer conductor 30. The locking recess 32 is locked to a locking projection 63A of the retainer 60. A locking projection 33 projecting downward is provided on the inner peripheral surface of the upper side of the outer conductor 30. The locking projection 33 is disposed to be locked to the locking piece 23 of the dielectric 20. An accommodating portion 34 expanded in diameter in the vertical direction is provided in a rear part of the outer conductor 30. A conductive rubber member 35 arranged on the outer periphery of the shield body 7 is press-fit into the accommodating portion 34.

[Conductive Rubber Member]

The conductive rubber member 35 is a resilient tubular member and made of a material obtained by mixing conductive carbon black or metal powder with one of various rubber materials such as natural rubber or synthetic rubber. As shown in FIG. 13, the conductive rubber member 35 is arranged in close contact with the outer periphery of the shield body 7 by being expanded in diameter and fit to the end part of the cable 2. Further, the conductive rubber member 35 presses the accommodating portion 34 of the outer conductor 30 from inside and is held in close contact with the inner peripheral surface of the accommodating portion 34. That is, the shield body 7, in which an induced current flows, and the outer conductor 30 to be grounded are electrically connected by the conductive rubber member 35. Therefore, the induced current flowing in the shield body 7 can be allowed to escape to ground by the conductive rubber member 35. Further, the conductive rubber member 35 press-fit into the accommodating portion 34 suppresses water intrusion into the outer conductor 30.

As shown in FIG. 13, the conductive rubber member 35 covers a part of the shield body 7 exposed from the sheath 8, and a rear part of the shield body 7 not covered by the conductive rubber member 35 is arranged in a water stop plug 36. Unlike this embodiment, a conductive rubber member may be integrated with a water stop plug.

As shown in FIG. 13, the water stop plug 36 is a tubular member disposed on the outer periphery of the end part of the cable 2. The outer peripheral surface of the water stop plug 36 is pressed in close contact with the inner peripheral surface of the housing 50, whereby water intrusion into the housing 50 is suppressed. The water stop plug 36 is provided at a position in contact with a rear end part of the conductive rubber member 35. The water stop plug 36 includes a small-diameter portion 36A to be held in close contact with the outer periphery of the shield body 7 and a large-diameter portion 36B to be held in close contact with the outer periphery of the sheath 8. An end surface of the sheath 8 is caught by a step between the small-diameter portion 36A and the large-diameter portion 36B. In this way, the water stop plug 36 can be positioned with respect to the cable 2. A front end part of the water stop plug 36 presses the conductive rubber member 35. Therefore, water intrusion into the shield body 7 through a boundary between the water stop plug 36 and the conductive rubber member 35 is effectively suppressed.

The above members constitute the shield terminal 10. In this embodiment, the shield terminal 10 is configured while the connector 1 is assembled by inserting the terminal module 37 into the outer conductor 30 accommodated in the housing 50 in advance (to be described in detail later). Here, the terminal module 37 of this embodiment is a member obtained by assembling the cable 2, the water stop plug 36, the conductive rubber member 35, the inner conductors 11 and the dielectric 20 (see FIGS. 7 and 12).

An example of an assembling procedure of the terminal module 37 is described below.

First, the connecting tube portions 12 of the inner conductors 11 are inserted into the tube accommodating portions 21 of the first dielectric 20A and the locking portions 14 and the locking recesses 22 are locked (see FIG. 13). The water stop plug 36 and the conductive rubber member 35 are assembled by being inserted onto the end part of the cable 2.

Subsequently, although the arrangement is vertically opposite to the one described in the embodiment, the shield body 7, the intervening insulating layer 6 and the wires 3 on the end part of the cable 2 are placed on the base portion 25 and the core wires 4 are placed on the wire barrels 15 with the inner conductors 11 arranged above the base portion 35 of the first dielectric 20A (arrangement when the direction indicated by the arrow Z in FIG. 13 is a downward direction). Here, the tip of the conductive rubber member 35 and the rear end of the first dielectric 20A are in contact. Subsequently, the wire barrels 15 and the core wires 4 are crimped (note that the wire barrels 15 and the core wires 4 are not crimped in FIGS. 12 to 14 for the convenience of graphical representation).

Finally, the second dielectric 20B is assembled with the first dielectric 20A. That is, the front engaging claws 26A and the rear engaging claws 26B of the second dielectric 20B are respectively engaged with the front engaging portions 25A and the rear engaging portions 25B of the first dielectric 20A (see FIG. 14). At this time, the partitioning portion 27 is disposed between the inner conductors 11 and the core wires 4 arranged in parallel in the lateral direction, and the clamp portions 28 clamp the intervening insulating layer 6. In the above way, the assembling of the terminal module 37 is completed (see FIG. 7).

[Plurality of Terminals]

As shown in FIG. 16, the plurality of (three in this embodiment as shown in FIG. 6) terminals 40 are female terminals and fabricated by press-molding a metal plate material such as brass. Each of the plurality of terminals 40 is provided with a connecting tube portion 41, a leaf spring portion 42, a locking portion 43, a wire barrel 44 and an insulation barrel 45. An unshielded male terminal (not shown) of the mating connector is inserted into the connecting tube portion 41. This male terminal contacts the leaf spring portion 42, and each of the plurality of terminals 40 and the male terminal are electrically connected. The locking portion 43 is locked to a lock receiving portion 52 provided in the housing 50.

As shown in FIG. 16, the plurality of terminals 40 are connected to end parts of wires 46. The cable 2 is used for high-speed communication, whereas the wire 46 is used to transmit an ordinary electrical signal or power. The wire 46 includes a core wire 47 and an insulation coating 48 covering the outer periphery of the core wire 47. The wire barrel 44 is crimped to the core wire 47, and the insulation barrel 45 is crimped to the insulation coating 48. A water stop plug 49 is provided on the outer periphery of the wire 46. The water stop plug 49 suppresses water intrusion into the housing 50.

[Housing]

Figure 9:
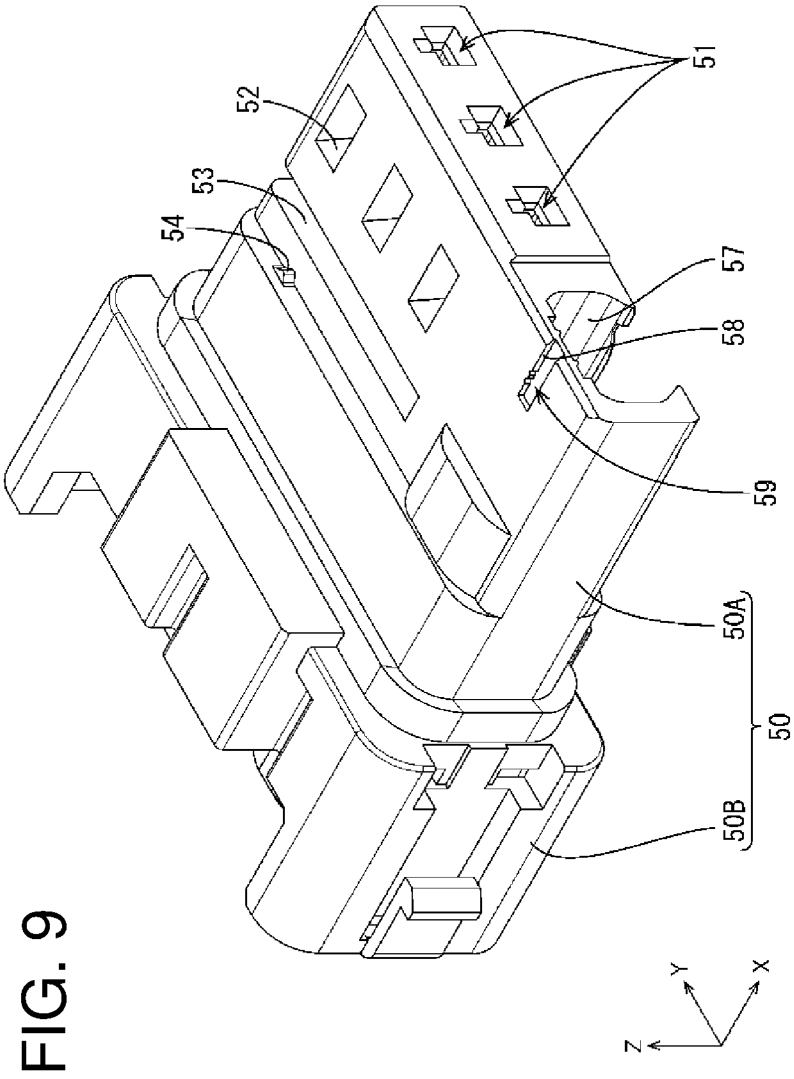
FIG. 9 is a perspective view of a housing.

The housing 50 is made of insulating synthetic resin and, as shown in FIG. 9, in the form of a block as a whole. A front half 50A of the housing 50 is connected to the mating connector. A rear half 50B of the housing 50 is more expanded in the vertical direction and lateral direction than the front half 50A.

As shown in FIG. 9, three terminal accommodating portions 51 are provided in parallel in the lateral direction on a left side of the front half 50A of the housing 50. The lock receiving portions 52 formed to penetrate in the vertical direction are provided on upper sides of the terminal accommodating portions 51. A groove-like slide groove portion 53 is provided behind the lock receiving portions 52. The slide groove portion 53 is formed to extend in the lateral direction across the three terminal accommodating portions 51. Chevron-shaped locking projections 54 projecting forward are provided behind the slide groove portion 53.

Figure 2:
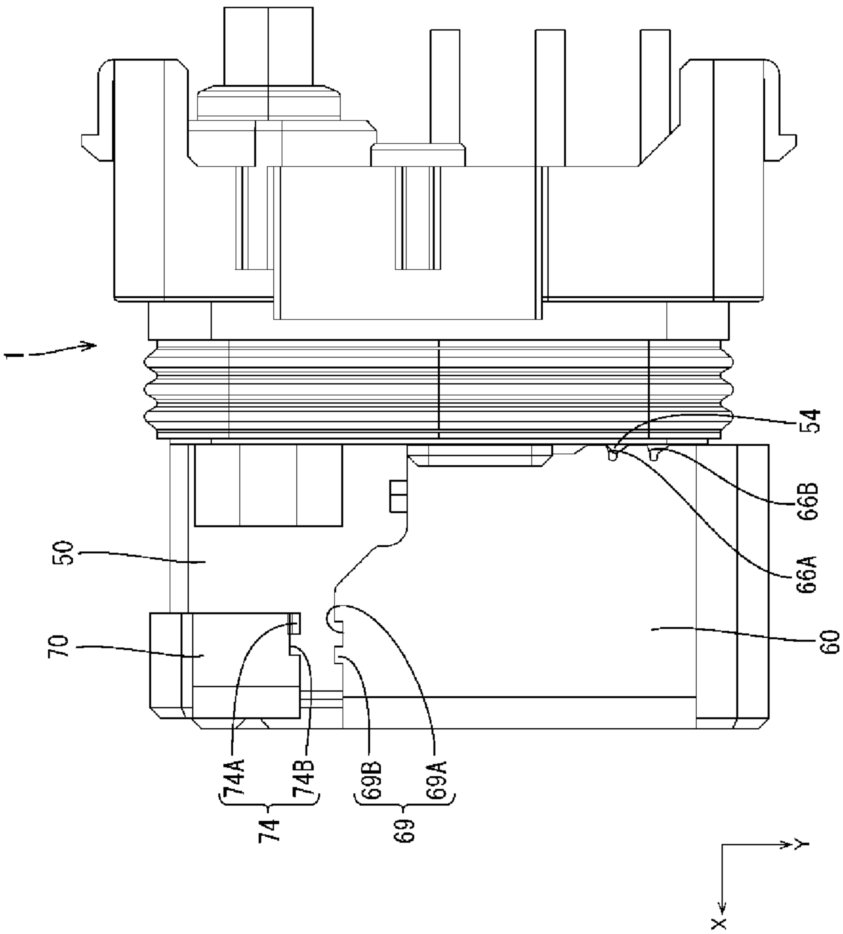
FIG. 2 is a plan view of the connector showing a state where a detecting member is at an initial position and a retainer is at a temporary locking position.
Figure 3:
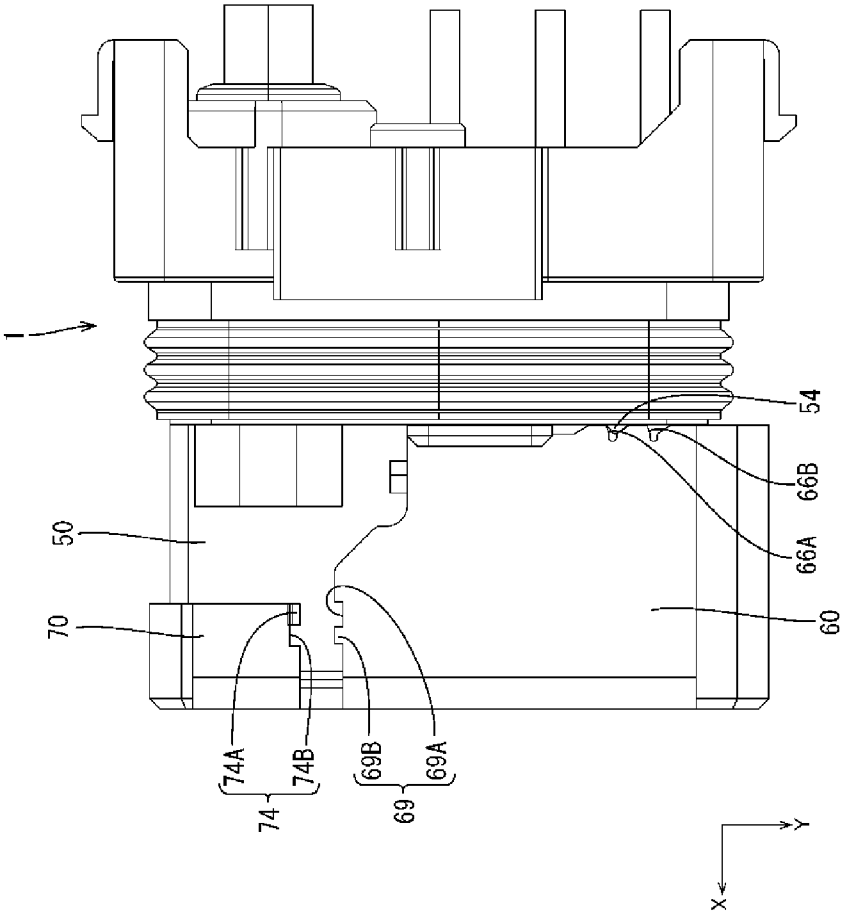
FIG. 3 is a plan view of the connector showing a state where the detecting member is at a detection position and the retainer is at the temporary locking position.
Figure 4:
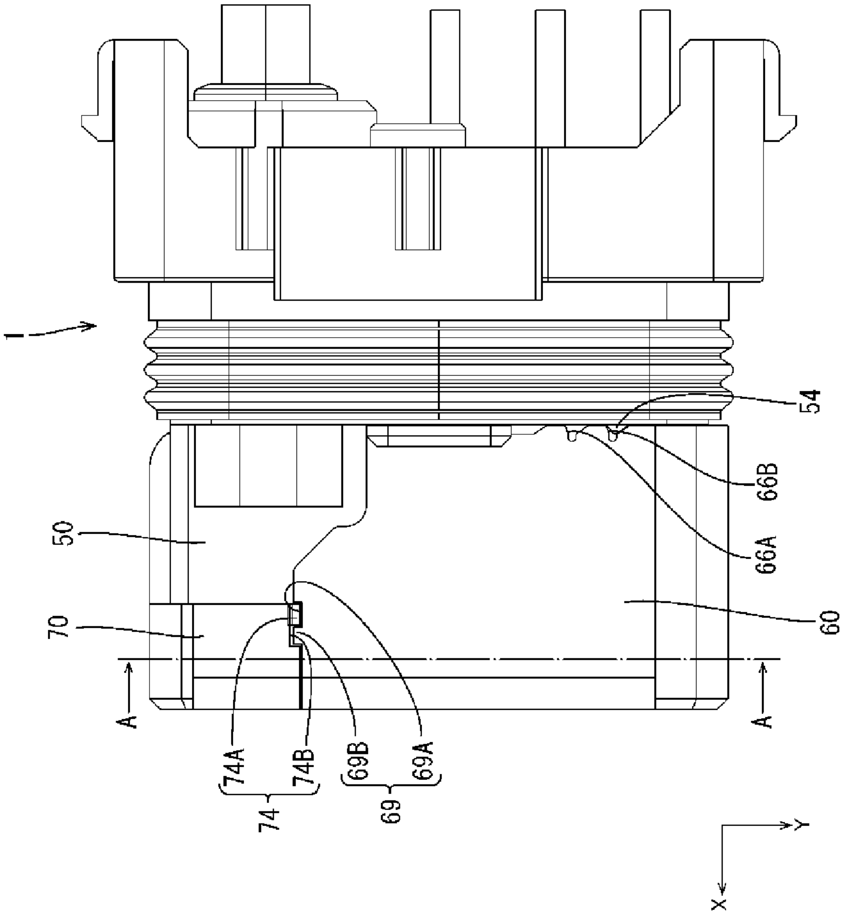
FIG. 4 is a plan view of the connector showing a state where the detecting member is at the detection position and the retainer is at a complete locking position.

As shown in FIG. 16, the plurality of terminals 40 are accommodated into the terminal accommodating portions 51, and the locking portions 43 and the lock receiving portions 52 are locked. A sliding wall portion 67 of the retainer 60 to be described later is engaged with the sliding groove portion 53. An engaging recess 55 to be engaged with an engaging portion 63B of the retainer 60 and a locking projection accommodating portion 56, into which the locking projection 63A of the retainer 60 is fit, are provided on a lower side of the terminal accommodating portion 51. The locking projection accommodating portion 56 is disposed to communicate with the locking recess 32 (see FIG. 13) of the outer conductor 30 in the lateral direction. As shown in FIGS. 2 to 4, the locking projections 54 are structures for holding the retainer 60 in the housing 50 (to be described in detail later).

Figure 15:
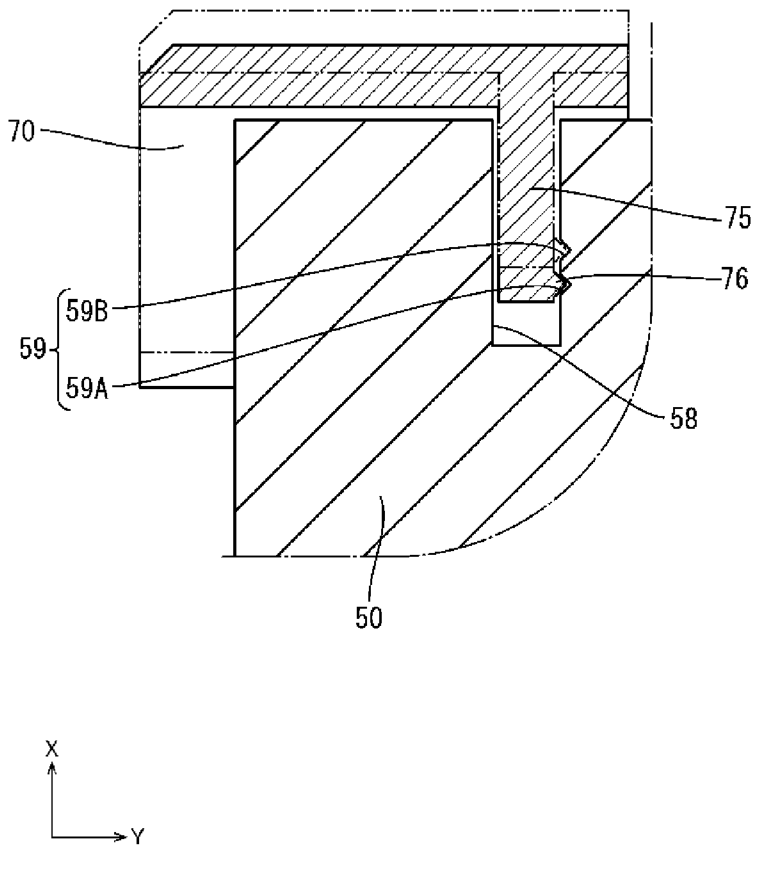
FIG. 15 is a section along D-D of FIG. 6 showing the initial position and the detection position of the detecting member.

As shown in FIG. 9, an outer conductor accommodating portion 57 is provided on a right side of the front half 50A of the housing 50. An engaging rib receiving portion 58 recessed downward is provided in an upper wall part of the outer conductor accommodating portion 57. The engaging rib receiving portion 58 is formed to be long in the front-rear direction. A locking recess 59 recessed further leftward is provided inside the engaging rib receiving portion 58. As shown in FIG. 15, the locking recess 59 includes a rear locking recess 59A and a front locking recess 59B disposed in front of the rear locking recess 59A. As shown in FIG. 6, the outer conductor 30 is accommodated into the outer conductor receiving portion 57. The engaging rib receiving portion 58 is engaged with an engaging rib 75 of the detecting member 70 to be described later.

[Retainer]

The retainer 60 of this embodiment covers the housing 50 from front, upper, lower and left sides as shown in FIGS. 1 and 6, and is mounted on the housing 50 by being slid in the lateral direction. As described later, the retainer 60 retains the plurality of terminals 40 in the housing 50 and guarantees via the detecting member 70 that the shield terminal 10 has been accommodated to the proper position inside the housing 50.

Figure 10:
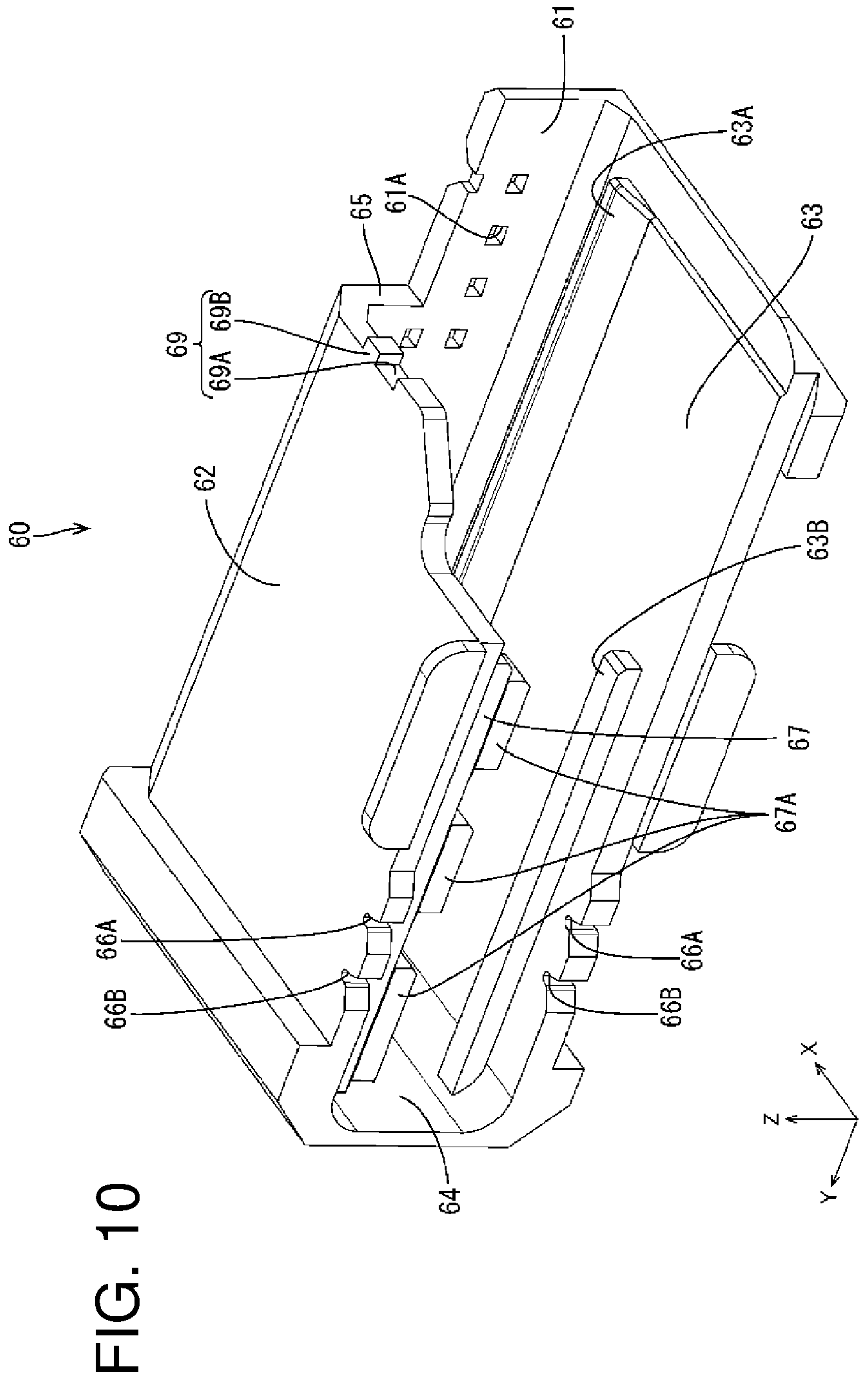
FIG. 10 is a perspective view of the retainer.

The retainer 60 is made of insulating synthetic resin and, as shown in FIG. 10, in the form of a hollow rectangular box. The retainer 60 is provided with a retainer-side front wall 61, a retainer-side ceiling wall 62 extending rearward from an upper end part of the retainer-side front wall 61, a bottom wall 63 extending rearward from a lower end part of the retainer-side front wall 61 and a side wall 64 connecting a left end part of the retainer-side ceiling wall 62 and that of the bottom wall 63. The retainer 60 is provided with a coupling recess 65 recessed from the retainer-side front wall 61 to the retainer-side ceiling wall 62. The retainer-side front wall 61 is provided with through holes 61A penetrating in the front-rear direction. As shown in FIGS. 13 and 16, the through holes 61A are disposed in front of the outer conductor accommodating portion 57 and the terminal accommodating portions 51, and the male terminals of the mating connector are inserted therethrough.

As shown in FIG. 10, the locking projection 63A projecting upward and the engaging protrusion 63B are formed to be long in the lateral direction on the bottom wall 63. The locking projection 63A is disposed on a front side of the bottom wall 63 and provided substantially over the entire region of the bottom wall 63 in the lateral direction. The engaging protrusion 63B is provided on a rear-left side of the bottom wall 63. As shown in FIG. 13, a right part of the locking projection 63A is locked to the locking recess 32 of the outer conductor 30. As shown in FIG. 16, a left part of the locking projection 63A is fit into the locking projection accommodating portion 56 of the housing 50. Further, the engaging protrusion 63B is engaged with the engaging recess 55 of the housing 50.

As shown in FIG. 10, a temporary locking recess 66A and a complete locking recess 66B recessed forward are formed in a rear end part on a left side of each of the retainer-side ceiling wall 62 and the bottom wall 63. The temporary locking recess 66A is provided to the right of the complete locking recess 66B while being spaced apart in the lateral direction from the complete locking recess 66B. As shown in FIGS. 2 to 4, the temporary locking recesses 66A and the complete locking recesses 66B are locked to the locking projections 54 (see FIG. 9) of the housing 50 (although not shown, the locking projection 54 is also provided on a lower side of the housing 50).

[Temporary Locking Position, Complete Locking Position]

As shown in FIGS. 2 and 3, the position of the retainer 60 with respect to the housing 50 in a state where the locking projections 54 and the temporary locking recesses 66A are locked is a temporary locking position. As shown in FIG. 4, the position of the retainer 60 with respect to the housing 50 in a state where the locking projections 54 and the complete locking recesses 66B are locked is a complete locking position. Since the retainer 60 and the housing 50 include structures to be engaged with each other as described above, the retainer 60 is held on the housing 50 movably between the temporary locking position and the complete locking position in the lateral direction (arrangement direction of the plurality of terminals 40).

As shown in FIG. 10, the sliding wall portion 67 is provided to project downward on the lower surface of a rear side of the retainer-side ceiling wall 62. The sliding wall portion 67 includes retaining portions 67A extending further downward from the sliding wall portion 67. Three retaining portions 67A are provided at intervals in the lateral direction. That is, the sliding wall portion 67 has a comb-like shape as a whole. As shown in FIG. 16, the sliding wall portion 67 is engaged with the slide groove portion 53 of the housing 50. When the retainer 60 is at the complete locking position, the retaining portions 67A are disposed inside the terminal accommodating portions 51 of the housing 50 and interfere with the connecting tube portions 41 of the plurality of terminals 40. In this way, the plurality of terminals 40 are retained inside the housing 50.

On the other hand, when the retainer 60 is at the temporary locking position, the retaining portions 67A are not disposed inside the terminal accommodating portions 51. Thus, the plurality of terminals 40 can be inserted into the terminal accommodating portions 51 (not shown). That is, the plurality of terminals 40 can enter spaces between the retaining portions 67A or to the right of the retaining portions 67A (see FIG. 10).

[Engaged Portion]

As shown in FIG. 10, an engaged portion 69 having an uneven shape is provided on a right end part of a front side of the retainer-side ceiling wall 62. The engaged portion 69 includes a recess-like engaged portion 69A recessed leftward and a projection-like engaged portion 69B projecting rightward. The recess-like engaged portion 69A and the projection-like engaged portion 69B are successively formed in the front-rear direction, and a front inner surface constituting the recess-like engaged portion 69A serves also as the outer surface of the projection-like engaged portion 69B. As shown in FIG. 4, the engaged portion 69 is engaged with an engaging portion 74 of the detecting member 70 to be described later.

[Detecting Member]

The detecting member 70 of this embodiment is fit into the coupling recess 65 of the retainer 60 and covers the housing 50 from above and front together with the retainer 60 as shown in FIG. 1. As described later, the detecting member 70 is a member for detecting that the shield terminal 10 has been accommodated to the proper position inside the housing 50.

Figure 11:
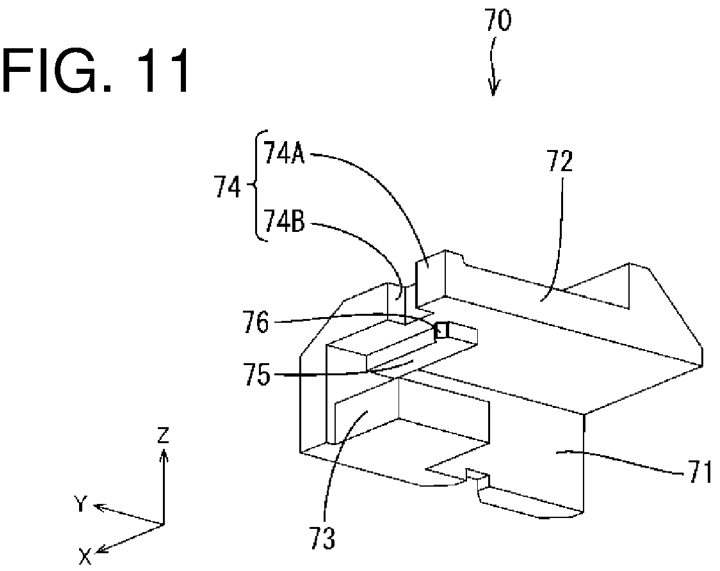
FIG. 11 is a perspective view of the detecting member.

The detecting member 70 is made of insulating synthetic resin and, as shown in FIG. 11, frame-shaped. The detecting member 70 is provided with a detecting member-side front wall 71 and a detecting member-side ceiling wall 72 extending rearward from an upper end part of the detecting member-side front wall 71. The detecting protrusion 73 projecting rearward is provided on a lower end part of a left side of the detecting member-side front wall 71. As shown in FIG. 6, the detecting protrusion 73 is engaged with the detecting protrusion receiving portion 31 of the outer conductor 30.

[Initial Position, Detection Position]

As shown in FIG. 11, an engaging rib 75 projecting downward and extending in the front-rear direction is provided on the lower surface of a left side of the detecting member-side ceiling wall 72. The engaging rib 75 is formed with a chevron-shaped locking projection 76 projecting leftward. As shown in FIG. 6, the engaging rib 75 is engaged with the engaging rib receiving portion 58 of the housing 50. As shown in FIG. 15, the locking projection 76 is locked to the locking recess 59 provided in the engaging rib receiving portion 58, i.e. to the rear locking recess 59A and the front locking recess 59B. The position (position indicated by a solid line) of the detecting member 70 with respect to the housing 50 in a state where the locking projection 76 and the rear locking recess 59A are locked is an initial position. The position (position indicated by a two-dot chain line) of the detecting member 70 with respect to the housing 50 in a state where the locking projection 76 and the front locking recess 59B are locked is a detection position. The detecting member 70 is held on the housing 50 movably between the initial position and the detection position in the front-rear direction (inserting/withdrawing direction of the shield terminal 10).

Figure 12:
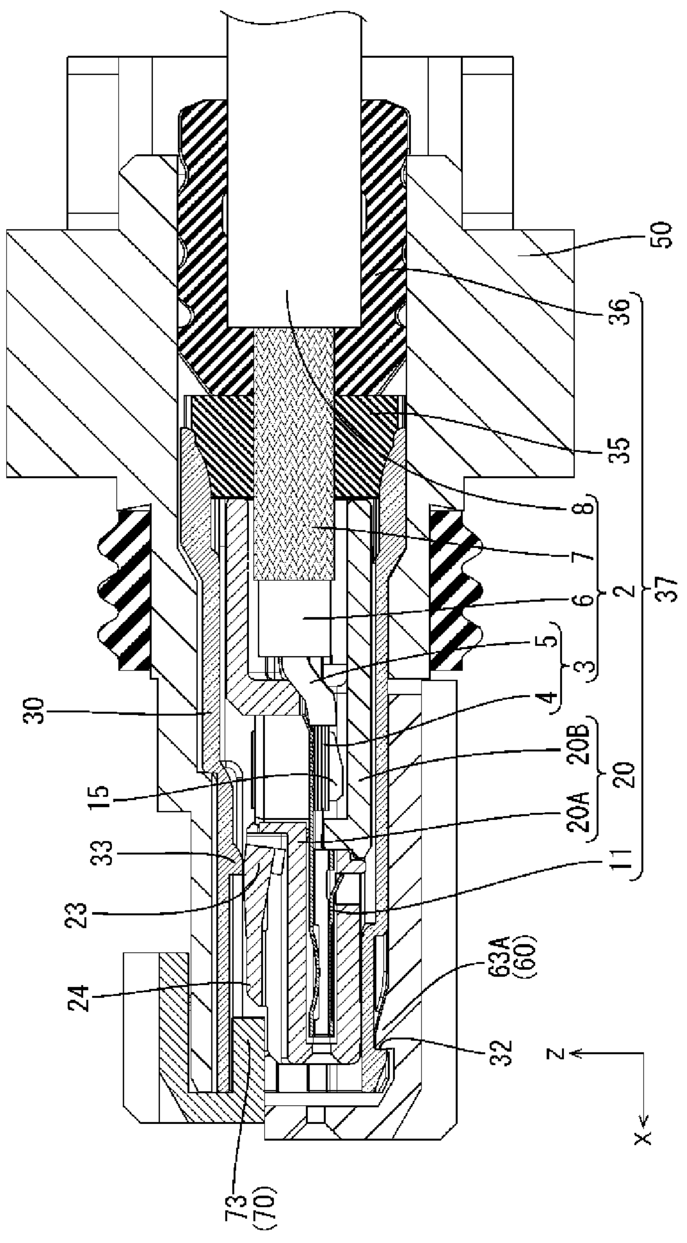
FIG. 12 is a section along B-B of FIG. 6 showing a state where the terminal module is not inserted to a proper position.

The initial position is a position where the detecting member 70 is assembled with the housing 50 before the shield terminal 10 is accommodated into the housing 50, and a position shown in FIG. 12 in a side view in section. On the other hand, the detection position is a position where the detecting member 70 interferes with the shield terminal 10 and the detecting member 70 is pushed forward by accommodating the shield terminal 10 to the proper position inside the housing 50, and a position shown in FIG. 13. A mechanism for moving the detecting member 70 from the initial position to the detection position is described in detail below together with an assembling method of the connector 1.

As shown in FIG. 11, the engaging portion 74 having an uneven shape is provided on a left end part of a rear side of the detecting member-side ceiling wall 72. The engaging portion 74 includes a projection-like engaging portion 74A projecting leftward and a recess-like engaging portion 74B recessed rightward. The projection-like engaging portion 74A and the recess-like engaging portion 74B are successively formed in the front-rear direction, and a rear inner surface constituting the recess-like engaging portion 74B serves also as the outer surface of the projection-like engaging portion 74A. As shown in FIG. 4, the projection-like engaging portion 74A is engaged with the recess-like engaged portion 69A and the recess-like engaging portion 74B is engaged with the projection-like engaged portion 69B.

The above members constitute the connector 1. An example of an assembling method of the connector 1 of this embodiment and an example of a method for detecting that the shield terminal 10 has been accommodated to the proper position inside the housing 50 are described in detail below.

First, the outer conductor 30 and the water stop member 9 are assembled with the housing 50. The outer conductor 30 is inserted into the outer conductor accommodating portion 57 from behind the housing 50.

Subsequently, the retainer 60 is assembled with the housing 50. The retainer 60 is mounted by being slid in the lateral direction with respect to the housing 50 by the engagement of the sliding wall portion 67 and the slide groove portion 53, the engagement of the locking projection 63A and the locking projection accommodating portion 56 and the engagement of the engaging protrusion 63B and the engaging recess 55 (see FIG. 16). By locking the temporary locking recesses 66A and the locking projections 54, the retainer 60 is held at the temporary locking position (see FIG. 2). Further, the locking projection 63A of the retainer 60 is locked to the locking recess 32 of the outer conductor 30 (see FIG. 12).

Subsequently, the detecting member 70 is assembled with the housing 50. The detecting member 70 is mounted by being slid in the lateral direction with respect to the housing 50 by the engagement of the engaging rib 75 and the engaging rib receiving portion 58 and the engagement of the detecting protrusion 73 and the detecting protrusion receiving portion 31 of the outer conductor 30 (see FIG. 6). The detecting member 70 is held at the initial position (see FIGS. 2 and 12) by locking the locking projection 76 and the rear locking recess 59A as shown by a solid line of FIG. 15.

The plurality of terminals 40 connected to the end parts of the wires 46 are inserted into the terminal accommodating portions 51 from behind the housing 50. By locking the locking portions 43 and the lock receiving portions 52, the plurality of terminals 40 are held in the terminal accommodating portions 51 (see FIG. 16). The terminal module 37 is inserted into the outer conductor 30 accommodated in the housing 50 from behind the housing 50 (see FIG. 12). As shown in FIG. 13, the assembling of the shield terminal 10 is completed by locking the locking piece 23 and the locking projection 33. That is, the position of the terminal module 37 (see FIGS. 7 and 12) shown in FIG. 13 is a proper position of the terminal module 37 with respect to the outer conductor 30, and the position of the shield terminal 10 shown in FIG. 13 is the proper position of the shield terminal 10 with respect to the housing 50.

However, in a conventional configuration provided with no detecting member unlike this embodiment, it is difficult to confirm that a terminal module has been inserted to a proper position inside an outer conductor. This is because it is difficult to increase a locking margin of a locking piece of a dielectric and a locking projection of the outer conductor in the case of considering a height reduction of a connector and the like since the outer conductor of a shield terminal is not provided with a hole. Further, a large insertion force is necessary to press-fit a water stop plug disposed on the outer periphery of a cable into a housing and press-fit a conductive rubber member into an accommodating portion of the outer conductor. Therefore, it is difficult to judge the locking of the locking piece of the dielectric and the locking projection of the outer conductor, i.e. the insertion of the terminal module to the proper position, from a responsive sense given when the terminal module is inserted into the outer conductor. Further, it is also difficult to guarantee the insertion position of the shield terminal, using a slide-type retainer for retaining a plurality of terminals.

In this embodiment, when the terminal module 37 is inserted into the outer conductor 30, the arched portion 24 on a base end part of the locking piece 23 contacts the detecting protrusion 73 of the detecting member 70, whereby the detecting member 70 is pushed forward as the terminal module 37 is inserted (see FIGS. 12 and 13). When the terminal module 37 is inserted to the proper position of the outer conductor 30 (i.e. when the shield terminal 10 is completed and accommodated to the proper position inside the housing 50), the detecting member 70 is disposed at the detection position (see FIGS. 3 and 13 and a two-dot chain line part of FIG. 15). Therefore, in this embodiment, it can be detected by the detecting member 70 that the shield terminal 10 has been accommodated to the proper position. On the other hand, in a state where the terminal module 37 is incompletely inserted as shown in FIG. 12, the detecting member 70 does not move from the initial position or is disposed at an intermediate position between the initial position and the detection position even if the detecting member 70 moves.

Figure 5:
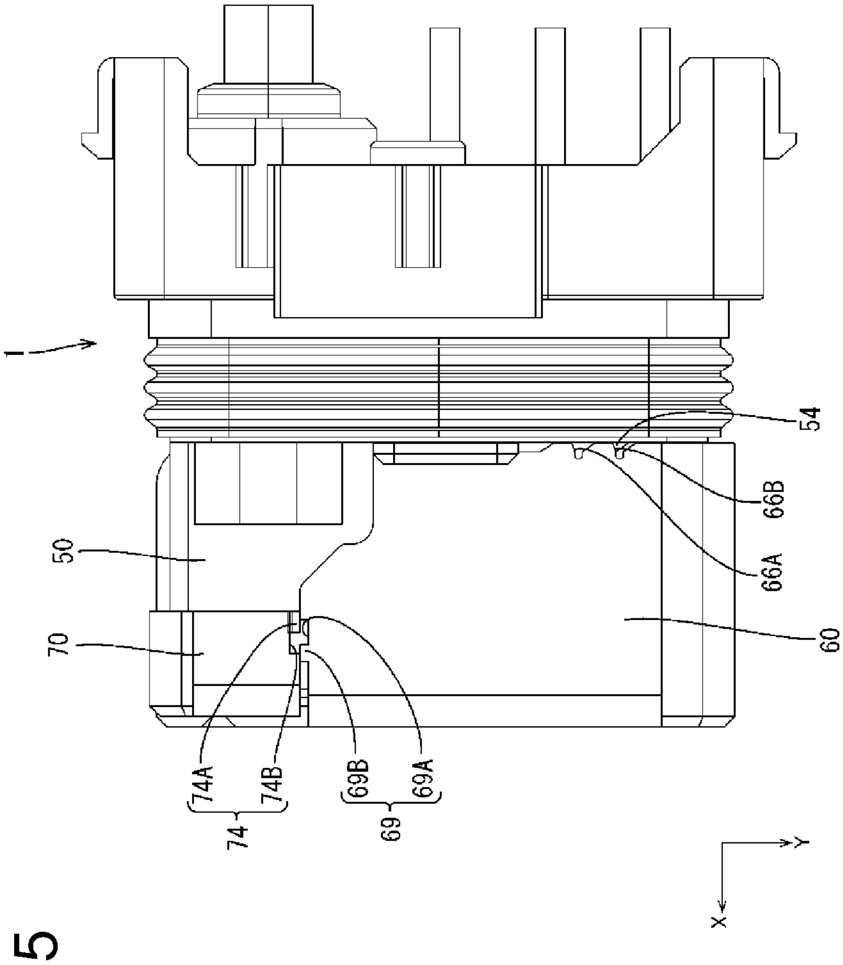
FIG. 5 is a plan view of the connector showing a state where the detecting member is at the initial position and the retainer is disabled to move to the complete locking position by interfering with the retainer.

Finally, by sliding the retainer 60 rightward from the temporary locking position (see FIG. 3) to the complete locking position (see FIG. 4) with the detecting member 70 moved to the detection position, the plurality of terminals 40 are retained. Here, if an attempt is made to erroneously move the retainer 60 to the complete locking position in a state where the detecting member 70 has not reached the detection position yet (e.g. a state shown in FIG. 12), the engaging portion 75 of the detecting member 70 and the engaged portion 69 of the retainer 60 interfere with each other without being engaged as shown in FIG. 5. Thus, the retainer 60 is disabled to move to the complete locking position. On the other hand, with the detecting member 70 disposed at the detection position as shown in FIG. 4, the retainer 60 is movable to the complete locking position and the engaging portion 74 and the engaged portion 69 are engaged. Therefore, in this embodiment, it can be detected also by the slide-type retainer 60 that the shield terminal 10 has been accommodated to the proper position inside the housing 50.

[Functions and Effects of Embodiment]

According to the embodiment, the following functions and effects are achieved.

The connector 1 of the embodiment is provided with the shield terminal 10 to be connected to the cable 2 configured such that the outer peripheries of the wires 3 are surrounded by the shield body 7, the plurality of terminals 40, the housing 50 for accommodating the shield terminal 10 and the plurality of terminals 40, the retainer 60 held on the housing 50 movably between the temporary locking position and the complete locking position in the arrangement direction of the plurality of terminals 40 and configured to retain the plurality of terminals 40 inside the housing 50 by moving to the complete locking position, and the detecting member 70 held on the housing 50 movably between the initial position and the detection position in the inserting/withdrawing direction of the shield terminal 10 and configured to move to the detection position by the shield terminal 10 being accommodated to the proper position inside the housing 50. The shield terminal 10 includes the inner conductors 11, the dielectric 20 for accommodating the inner conductors 11 and the tubular outer conductor 30 for covering the outer periphery of the dielectric 20 and to be electrically connected to the shield body 7. When the detecting member 70 is not at the detection position, the retainer 60 is disabled to move to the complete locking position by interfering with the detection position 70. When the detecting member 70 is at the detection position, the retainer 60 is movable to the complete locking position.

According to the above configuration, it can be detected that the shield terminal 10 has been accommodated to the proper position inside the housing 50 since the retainer 60 is movable to the complete locking position.

The connector 1 according to the embodiment is provided with the tubular conductive rubber member 35 for electrically connecting the outer conductor 30 and the shield body 7, the terminal module 37 is configured to include the conductive rubber member 35, the cable 2, the inner conductors 11 and the dielectric 20, and the detecting member 70 moves from the initial position to the detection position by contacting the terminal module 37 when the terminal module 37 is inserted into the outer conductor 30 accommodated in the housing 50.

According to the above configuration, the shield terminal 10 can be easily assembled and accommodated to the proper position inside the housing 50 by inserting the terminal module 37 into the outer conductor 30 accommodated in the housing 50.

In the embodiment, the detecting member 70 includes the engaging portion 74 and the retainer 60 includes the engaged portion 69 to be engaged with the engaging portion 74 by a movement of the retainer 60 to the complete locking position when the detecting member 70 is at the detection position.

According to the above configuration, the engaging portion 74 of the detecting member 70 and the engaged portion 69 of the retainer 60 are engaged, whereby it can be detected that the shield terminal 10 has been accommodated to the proper position inside the housing 50.

Other Embodiments (1) Although the connector 1 is provided with the water stop member 9 and the water stop plugs 36, 49 in the above embodiment, there is no limitation to this and a connector may not be provided with a water stop member and water stop plugs.

(2) Although the connector 1 is configured by inserting the terminal module 37 into the outer conductor 30 accommodated in the housing 50 in the above embodiment, there is no limitation to this and a connector may be configured by inserting a shield terminal connected to a cable into a housing.

LIST OF REFERENCE NUMERALS

- 1: connector
- 2: cable
- 3: wire
- 4: core wire
- 5: insulation coating
- 6: intervening insulating layer
- 7: shield body
- 8: sheath
- 9: water stop member
- 10: shield terminal
- 11: inner conductor
- 12: connecting tube portion
- 13: leaf spring portion
- 14: locking portion
- 15: wire barrel
- 20: dielectric
- 20A: first dielectric
- 20B: second dielectric
- 21: tube accommodating portion
- 22: locking recess
- 23: locking piece
- 24: arched portion
- 25: base portion
- 25A: front engaging portion
- 25B: rear engaging portion
- 26A: front engaging claw
- 26B: rear engaging claw
- 27: partitioning portion

28: clamp portion
30: outer conductor
31: detecting protrusion receiving portion
32: locking recess
33: locking projection
34: accommodating portion
35: conductive rubber member
36: water stop plug
36A: small-diameter portion
36B: large-diameter portion
37: terminal module
40: terminal
41: connecting tube portion
42: leaf spring portion
43: locking portion
44: wire barrel
45: insulation barrel
46: wire
47: core wire
48: insulation coating
49: water stop plug
50: housing
50A: front half
50B: rear half
51: terminal accommodating portion
52: lock receiving portion
53: slide groove portion
54: locking projection
55: locking recess
56: locking projection accommodating portion
57: outer conductor accommodating portion
58: engaging rib receiving portion
59: locking recess of housing
59A: rear locking recess
59B: front locking recess
60: retainer
61: retainer-side front wall
61A: through hole
62: retainer-side ceiling wall
63: bottom wall
63A: locking projection
63B: engaging protrusion
64: side wall
65: coupling recess
66A: temporary locking recess
66B: complete locking recess
67: sliding wall portion
67A: retaining portion
69: engaged portion
69A: recess-like engaged portion
69B: projection-like engaged portion
70: detecting member
71: detecting member-side front wall
72: detecting member-side ceiling wall
73: detecting protrusion
74: engaging portion
74A: projection-like engaging portion
74B: recess-like engaging portion
75: engaging rib
76: locking projection

What is claimed is:

1. A connector, comprising:

a shield terminal to be connected to a cable configured such that an outer periphery of a wire is surrounded by a shield body;

a plurality of terminals;

a housing for accommodating the shield terminal and the plurality of terminals;

a retainer held on the housing movably between a temporary locking position and a complete locking position in an arrangement direction of the plurality of terminals, the retainer retaining the plurality of terminals inside the housing by moving to the complete locking position; and a detecting member held on the housing movably between an initial position and a detection position in an inserting/withdrawing direction of the shield terminal, the detecting member moving to the detection position by the shield terminal being accommodated to a proper position inside the housing, the shield terminal including an inner conductor, a dielectric for accommodating the inner conductor and a tubular outer conductor for covering an outer periphery of the dielectric and to be electrically connected to the shield body, the retainer being disabled to move to the complete locking position by interfering with the detecting member when the detecting member is not at the detection position, and the retainer being movable to the complete locking position when the detecting member is at the detection position.

2. The connector according to claim 1, comprising a tubular conductive rubber member for electrically connecting the outer conductor and the shield body, wherein:

a terminal module is configured to include the conductive rubber member, the cable, the inner conductor and the dielectric, and the detecting member moves from the initial position to the detection position by contacting the terminal module when the terminal module is inserted into the outer conductor accommodated in the housing.

3. The connector according to claim 1, wherein:

the detecting member includes an engaging portion, and the retainer includes an engaged portion to be engaged with the engaging portion by the retainer moving to the complete locking position when the detecting member is at the detection position.

* * * * *